United States Patent [19]

De L'Eprevier

[11] Patent Number: 5,252,357
[45] Date of Patent: Oct. 12, 1993

[54] PROCESS FOR THE MANUFACTURE OF A RIGID INSULATING REFRACTORY MATERIAL AND MATERIAL THUS OBTAINED

[75] Inventor: Alain G. De L'Eprevier, Le Brethon, France

[73] Assignee: Produits Cellulosiques Isolants-Procelis, France

[21] Appl. No.: 836,273

[22] PCT Filed: Jul. 25, 1991

[86] PCT No.: PCT/FR91/00616
§ 371 Date: Mar. 2, 1992
§ 102(e) Date: Mar. 2, 1992

[87] PCT Pub. No.: WO92/02472
PCT Pub. Date: Feb. 20, 1992

[30] Foreign Application Priority Data

Aug. 3, 1990 [FR] France ............................. 90 10160

[51] Int. Cl.$^5$ ............................................. B03D 3/02
[52] U.S. Cl. .................................. 427/226; 427/379
[58] Field of Search ............................. 427/226, 379

[56] References Cited

U.S. PATENT DOCUMENTS

| | | | |
|---|---|---|---|
| 3,734,767 | 5/1973 | Church et al. | 427/226 |
| 3,817,781 | 6/1974 | Church et al. | 427/226 |
| 3,925,575 | 12/1975 | Church et al. | 427/226 |
| 3,944,683 | 3/1976 | Church et al. | 427/226 |
| 4,568,652 | 2/1986 | Petty, Jr. | 501/127 |

FOREIGN PATENT DOCUMENTS 2097777 11/1982 United Kingdom .

OTHER PUBLICATIONS

Chemical Abstracts, vol. 93, No. 26, Dec., 1980.
Journal of the Ceramic Society of Japan, vol. 98, No. 1, 1990, "Surface Modification of Mullite by Partial Infiltration of Zirconia".
Journal of the Ceramic Society of Japan, vol. 98, 1990, "Effect of HIP Treatment on the Fracture Strength of Reaction-Sintered SiC".

*Primary Examiner*—Janyce Bell
*Attorney, Agent, or Firm*—Parkhurst, Wendel & Rossi

[57] ABSTRACT

A process for manufacturing a refractory material adapted for contact with a molten ferrous metal, comprising the steps of: impregnating the base refractory material with a zirconium containing solution, the base refractor material having a porosity of not less than 85% and not more than 95%, drying the impregnated base refractory material at a temperature of 800°-900° C. for two to six hours to form a zirconia protective layer covering walls of pores in the base refractory material.

4 Claims, No Drawings

PROCESS FOR THE MANUFACTURE OF A RIGID INSULATING REFRACTORY MATERIAL AND MATERIAL THUS OBTAINED

TECHNICAL FIELD

The invention relates to a process for the manufacture of a porous and rigid insulating refractory material capable of working in contact with a molten ferrous metal, especially as a casting for steel. It also relates to the rigid insulating porous refractory material thus obtained.

It is well known to employ refractory materials in contact with a molten metal, especially when casting steel. It is important that this material should be capable of withstanding temperatures of more than 1000° C., especially from 1400° to 1600° C. (in the case of steel) without damage, deterioration or corrosion.

In practice, brick or concrete are essentially employed, such materials being dense and massive. Now, it is known that these materials are not well suited for use in continuous casting processes, because of their low thermal insulating nature. This results in great difficulty in controlling heat losses and hence maintaining the metal temperature, which is essential in continuous casting processes in order to obtain a uniform metallurgical quality.

Insulating composite ceramic materials are known, which are employed essentially for minimizing the heat losses from an enclosure such as a furnace, due to their very low thermal conductivity. Unfortunately, these products, while indeed being refractory and insulating, are easily wetted and penetrated by the molten steel. The metal not only ruins the insulating nature by entering the pores of the material, but also tends to corrode the ceramic by being oxidized in contact with the ceramic.

PRIOR ART

In document FR-A-1,438,091 it has been proposed to improve the whiteness of porcelain by impregnating it, especially under vacuum, with zirconia acetate, and then drying it and firing it. During the firing the zirconia is fixed by silicate bonds, and this imparts an improved whiteness to the ceramic.

In document U.S. Pat. No. 4,568,652 it has been proposed to decrease the harmful effects of the impurities contained in refractory bauxites with a low content of alumina (42 to 70%) and of low porosity (porosity lower than 20%), by impregnating them with a solution containing at most ten percent (10%) of a metal capable of forming a refractory oxide, such as chromium, iron, calcium, molybdenum, zirconium, for example under vacuum, and then, after drying at 110° C., by heating the impregnated material at least to 1450° C. The oxides formed then react with the impurities to increase the refractoriness of the base material and to decrease the external wettability by glass or slags.

The invention mitigates these disadvantages. It is aimed at a process for preparing an insulating and rigid porous refractory material which is not wetted, nor penetrated or corroded by liquid steel, and is easy to use and suitable in particular for a utilization in the various continuous or pressure casting processes for molten ferrous metal, especially by making it possible to control the rates of cooling of the metal.

DESCRIPTION OF THE INVENTION

The process of the present invention for the manufacture of a rigid insulating refractory material capable of working in contact with a molten ferrous metal, in which:

first of all, a base refractory ceramic material is impregnated with a solution of a zirconium salt;

this ceramic material thus impregnated is then dried;

and finally this dried material is pyrolyzed, is characterized:

in that the base ceramic material is a highly porous material having a porosity of between 85 and 95%;

and in that the pyrolysis is carried out at a temperature of between 800° and 900° C. for two to six hours, so that the walls of the pores of the base ceramic material are covered with a fine protective layer of zirconia.

In other words, the invention consists in immersing a highly porous refractory ceramic material in a solution of zirconium salts and then, after drying, in pyrolyzing this solution so as to convert this zirconium salt into zirconium oxide and thus to form a fine oxide layer which covers the walls of the pores (or of the fibers) of the base ceramic material, which nevertheless remains highly porous, rigid and refractory.

It would not have been expected that the deposition of a fine layer of zirconia by the pyrolysis of a zirconium salt on the walls of the pores of a ceramic material avoids the wettability of this material by molten steel, whereas hitherto this material was easily wetted by molten steel. In other words, the present invention efficaciously solves a long-felt need in the art.

According to a first fundamental characteristic of the invention, the base ceramic material must exhibit a porosity of between 85 and 95%. This porosity is preferably near 90%.

In the prior state of the art, only dense refractory materials were employed, which materials do not have the required insulating nature because their porosity is lower than 15%. This base ceramic material must additionally exhibit a sufficient refractoriness to withstand the temperature of the molten ferrous metal, especially of steel. In practice, use is made of ceramics of fibrous structure or of ceramic foams with cells which are at least partially open.

It has been noted that if the porosity of the base ceramic material is lower than 85% the insulating nature of the final product is lowered too much for the envisaged utilization and, moreover, the machinability decreases rapidly. Similarly, if the initial porosity exceeds 95%, the mechanical content of the material becomes too low to contain the pressure of the molten metal, machining itself also, becomes difficult due to lack of rigidity and, finally, the insulating nature decreases rapidly again below an optimum density threshold.

Advantageously, in practice the soluble zirconium salt is an organic salt such as acetate, or even formate, propionate or a nitrate. It is important that the should be easily soluble in water, especially temperature, in order to penetrate the porous material to the very core and thus to fill all the pores. It is important that the zirconium oxide formed should be the only solid pyrolysis residue, to keep the refractoriness of the base product as high as possible.

Further, preferably the concentration of the aqueous impregnating solution of zirconium acetate is between 5 and 23% by weight of zirconia ($ZrO_2$), and preferably between 15 and 20%, to obtain a continuous fine layer of zirconia lining the walls of the pores. If the concentration is lower than 5% no significant result is obtained, and if this concentration is lower than 15% the fine zirconia layer will not be always continuous, and will subsequently deteriorate the nonwettability by the molten ferrous metal. If this concentration exceeds 23% the impregnating solution is not only not available commercially but would be too viscous to enter and impregnate the pores easily. It has been noted that good results are obtained with a concentration of between 18 and 20% by weight of zirconium acetate;

The impregnation may be performed merely by soaking or full-bath immersion at room temperature. Because of the high porosity of the base material it is unnecessary, as in the prior state of the art, to make the solution enter by suction or by a vacuum effect.

Drying may be performed in an oven for a number of hours at 110°–130° C., drying being a function of the volume of the component to be dried.

The impregnating solution may contain known additives in order to avoid or to minimize the migration of zirconia to the surface during the drying stage.

The solution may also harmlessly contain up to 2% of impurities such as hafnium oxide or other metals usually associated with zirconium in nature or employed to stabilize its structure.

The pyrolysis is performed between 800° C. and 900° C., for two to six hours, especially four hours, in the presence of air to facilitate the formation of zirconium oxide; it is completely unnecessary to heat to temperatures as high as 1450° C., as in the state of the art recalled in the preamble, since there is no attempt to combine the impurities chemically, but merely to form a very fine homogeneous and protective layer (of the order of a nanometer) of zirconia on the walls of the pores of the base ceramic material.

It has been noted that if the pyrolysis is conducted at a temperature below 800° C., it is incomplete and a relatively high proportion of carbon remains in the pores. Similarly, if the temperature exceeds 900° C., the nascent zirconia tends to combine with the support rather than to crystallize into a thin and continuous layer of pure zirconia.

The finished refractory product obtained is highly porous (porosity of 80% and above) and hence highly insulating. Despite this high porosity, this material stays perfectly rigid. Since it has good mechanical strength it is therefore easy to machine. According to an original characteristic, the walls of its pores or of the fibers of which this ceramic material consists are covered with a uniform and homogeneous fine layer of zirconium oxide with a thickness of the order of a nanometer. Unexpectedly, despite the high proportion of pores and therefore of openings, molten steel does not enter and penetrate the material, whereas it was previously known that molten steel wets and easily enters porous ceramic materials. As a result, this material can be advantageously employed for the continuous casting or for the pressure casting of ferrous materials, especially of steel.

It is thought that the fine zirconia layer formed on the walls of the pores or on the fibers creates surface tension forces which repel the molten steel and thus prevent it from entering the pores.

When compared with the known state of the art recalled in the preamble, the invention is differentiated:
on the one hand, by the present process utilizing a
highly porous base ceramic refractory material, an organic and soluble salt of zirconium alone, and pyrolysis at temperatures of between 800° and 900° C.;
on the other hand, by the resultant refractory material,
having high porosity and hence good insulating characteristics; rigidity and hence machinability and, finally, nonwettability by molten ferrous metals, especially steel.

The way in which the invention can be implemented and the advantages which stem therefrom will emerge better from the examples of embodiment, which follow.

Example 1

The base porous refractory ceramic material employed is a sheet marketed by the Applicant Company under the registered trademark "Procelit 160", 650×320×30 mm in size, heat resistant up to 1600° C. This sheet porous refractory ceramic material has a composition containing 85% of alumina and 15% of silica and a density close to 0.3 (that is a porosity of 92%).

This sheet is immersed at room temperature for approximately ten minutes (until the last bubbles disappear) in an aqueous solution containing 20% by weight of zirconium acetate. The porous plate absorbs approximately 2.5 times its dry weight of solution.

To remove the water completely, the sheet is then dried for twenty-four hours in a ventilated oven at 130° C.

The sheet is then pyrolyzed for four hours in an electric furnace at 800° C. During pyrolysis, the zirconium acetate is converted into zirconium oxide and at the same time residual water and carbon dioxide are eliminated into the atmosphere.

A sheet is obtained which has the same dimensions as the starting sheet, consisting of a composite ceramic material of high porosity (80% porosity), in which the walls of the pores are covered with a fine layer of zirconia (thickness of the order of a nanometer, especially between 0.2 and 0.4 nanometers), and this additionally favorably increases the rigidity of the material.

This sheet, with a density close to 0.45 (against 0.3) and a crushing strength of 1.5 N/mm$^2$, has an average composition by weight of:
65% of alumina (against 85%);
10% of silica (against 15%);
25% of zirconia.

Despite its very high porosity, this sheet, to which molten steel does not adhere, does not exhibit any infiltration when it is subjected to a pressure resulting from a layer of molten steel 300 mm in height for fifteen minutes and more.

These rigid sheets are easy to machine and are perfectly suited for the manufacture of headers and of nozzles for the continuous casting of steel and/or pressure casting.

The zirconia deposited on the wall of the pores slightly affects the refractoriness of the sheet but, above all, prevents the molten liquid steel from entering the pores of the material and/or from corroding it, despite the high porosity of the finished sheet.

As the immersion treatment is performed starting with a solution, good penetration to the core is obtained. As a result, this treatment can be performed on roughcasts, and this limits the losses of zirconia during subsequent finishing machining when very accurate dimensions must be obtained.

Example 2

The same sheet of Procelit 160 employed as such in contact with molten steel has its porosity entered by the steel over more than fifteen millimeters in depth after three minutes in contact with the molten metal. This infiltration completely deteriorates the insulating nature of the material and makes it unsuitable for this application.

Example 3

The same sheet of Procelit 160, this time impregnated with a salt of another metal, such as chromium, magnesium and/or any other metal whose refractory oxides are commonly employed in steel manufacture, is also entered by the molten steel and rapidly made useless. Except for aluminum, whose oxide has no effect on the refractoriness and the wettability, all have been found to be detrimental.

Example 4

The same sheet prepared according to the process of Example 1, but pyrolyzed at 1450° C., exhibits a wettability by molten steel which is slightly increased when compared with Example 2. The nascent zirconia layer has reacted with the silica and the alumina of the substrate to form new chemical combinations and the surface tension forces which prevented the entry of the metal into the pores are lost.

The process according to the invention has numerous advantages, especially when compared with the solutions known hitherto. There may be mentioned:

the simplicity of manufacture;
the ease of finishing the components by machining, even with conventional steel or carbide tools;
the nonwettability of the material by molten steel, despite the high porosity, whereas it was known that molten steel easily wetted porous ceramics;
the possibility of controlling the casting temperature of the molten ferrous metal while considerably reducing the heat losses through the refractories.

As a result, these refractory materials are perfectly suited for the continuous or pressure casting of steel.

I claim:

1. A process for manufacturing a refractory material adapted for contact with a molten ferrous metal, comprising the steps of:

impregnating the base refractory material with a zirconium containing solution, said base refractory material having a porosity of not less than 85% and not more than 95%;

drying the impregnated base refractory material; and pyrolyzing the impregnated base refractory material at a temperature of 800°-900° C. for two to six hours to form a zirconia protective layer covering walls of pores in the base refractory material.

2. The process of claim 1, wherein the zirconium containing solution comprises 15-23 wt. % of zirconium acetate.

3. The process of claim 2, wherein the concentration of zirconium acetate is 18-20 wt. %.

4. The process of claim 1, wherein the base refractory material is completely immersed in the zirconium containing solution, and drying is carried out at a temperature of 110°-130° C.

* * * * *